United States Patent Office 2,786,751
Patented Mar. 26, 1957

2,786,751

METHOD OF SEPARATING COBALT-NICKEL-MANGANESE

Tuhin Kumar Roy, Elizabeth, N. J., and Felix Alfred Schaufelberger, Stamford, Conn.

No Drawing. Application June 9, 1954,
Serial No. 435,624

2 Claims. (Cl. 75—108)

This invention relates to treatment of non-ferrous metals-bearing liquors. More particularly, it relates to the separation of manganese from liquors containing dissolved salts of manganese, cobalt and nickel. Still more particularly, it relates to separation of manganese, cobalt and nickel values from liquors containing the dissolved salts thereof.

Nickel and cobalt metals and their naturally occurring minerals are very similar to one another in both physical and chemical properties. Moreover, both metals occur together in their natural deposits and cannot be separated by conventional ore dressing methods. For these reasons, both metals are generally present in varying amounts in liquors resulting from any type of leaching of either nickel or cobalt natural or intermediate products.

Many processes have been either proposed or used for treating liquors containing dissolved cobalt and nickel salts. Some of these involve the oxidation of cobalt to cobaltic hydroxide while the liquor is being partially neutralized with an alkali. Cobalt is easier to oxidize than nickel and the resulting cobaltic salt will hydrolyze and precipitate from a slightly more acidic solution than will the nickelous hydroxide. Other more recently suggested procedures are based on differences in stability and/or solubility of various metal ammine complexes in aqueous solution under certain hydrogen ion concentrations. One of the more successful of these comprises controlling the hydrogen ion concentration of an oxidized solution of cobalt and nickel "pentammines" whereby the latter is neutralized and forms insoluble nickel ammonium double salt leaving a substantially nickel-free cobalt ammine liquor.

While such processes are generally successful in separating nickel from cobalt, they are primarily adapted for practice on nickel-cobalt bearing liquors substantially free of other metallic constituents. Certain nickel-cobalt bearing ores treated for the recovery of such metals, however, also contain manganese in sufficient content to warrant attempted recovery thereof as a useful product. While methods are known whereby the nickel and cobalt contents of such ores may be put into solution sufficiently free from manganese as well as other metal values, the separated manganese is in a form which per se is of little if any value and is difficult to treat to recover therefrom a valuable manganese product.

Methods are also known whereby such ores may be treated to put into solution the nickel-cobalt-manganese contents substantially free of extraneous metal values and impurities. It would be highly desirable, therefore, if a procedure could be devised for separating simply and efficiently the manganese content of such liquors in a form valuable as such without further processing. Particularly would such a process be desirable if the resultant manganese-free solution could be processed directly in a convenient and efficient manner for recovery of the cobalt and nickel content.

It is, therefore, a primary object of this invention to provide a successful separation procedure for the treatment of nickel-cobalt-manganese-bearing liquors for the separation of manganese. It is a further object of this invention that manganese so separated be recoverable directly in a useful and saleable form. It is still a further object of this invention to separate and recover the cobalt and nickel values of such liquors preferably in a form in which elemental metal powder of high purity may be readily obtained.

It has now been surprisingly discovered in accordance with this invention that such liquors may be successfully treated to recover the manganese content in useful form. Still more surprising, the residual liquor is in a form which may be directly treated in an effective manner to separate the nickel content leaving a substantially manganese- and nickel-free cobalt-bearing liquor. In general, the process of this invention comprises subjecting a nickel-cobalt-manganese-bearing liquor appropriately adjusted as to its ammonia and ammonium sulfate contents, whereby cobalt and nickel are in solution as soluble ammine complexes, to the action of an oxygen-bearing oxidizing gas. Oxidation is continued for sufficient time to precipitate substantially the entire manganese content and oxidize the cobalt content to soluble cobaltic "pentammine" complex. The oxidized liquor, either before or after separation of precipitated manganese solids, is treated to precipitate the nickel content leaving a substantially nickel- and manganese-free cobalt-bearing liquor.

In accordance with the process of this invention the dissolved cobalt and nickel contents must be in the form of soluble ammine complexes. These may be generally represented by the formula $Me(NH_3)_x$ wherein $x$ is from about 2 to about 6. Although the form of the soluble ammine complexes may vary considerably so far as precipitation of the manganese content is concerned, it is highly desirable in precipitation of the nickel content that the cobalt ammine complex be in a very acid-stable form. Such a form is cobalt "pentammine" wherein $x$ in the above formula is about 5. For the purposes of this invention, therefore, when reference is made to cobalt and/or nickel "pentammine" complex and/or solution it shall be understood to mean that a part, and preferably a substantial part, of the metal ammine complex is in that form in which $x$ is about 5.

In general, the applicability of the present process is not limited to the treatment of liquors which contain initially the metals as salts of any particular acid. The separation of dissolved nickel according to the process of this invention, however, depends upon the unique differences in stability at certain hydrogen ion concentrations of soluble cobaltic and nickel ammine sulfates and on the substantial insolubility of nickel ammonium sulfate under such conditions. The liquor at some stage, therefore, must be adjusted to provide sufficient sulfate ions to satisfy the requirements for the oxidized cobalt content and the nickel content thus enabling the separation to be effected. If the liquor is not already a sulfate liquor, this adjustment should be made prior to oxidation since certain anions, as chloride, form insoluble cobaltic cations, for instance, cobaltic chloro pentammine. Usually, however, liquors encountered in which cobalt, nickel and manganese are in solution free of other metals are sulfate liquors.

The dissolved metal ratios of the original liquor are not particularly critical. Manganese may be in widely varied ratios to the other metal constituents and effectively precipitated from solution. Similarly, precipitation from solution of manganese as well as nickel is also effectively obtained on liquors of varied dissolved cobalt to nickel ratios. Nickel precipitation, however, is particularly effective when the process of this invention is practiced on liquors in which the cobalt content ranges from about equivalent quantities with nickel up through those in which the cobalt content is predominant. Commercial liquors encountered will find cobalt and nickel contents in varying ratios but both generally in excess of manganese.

The first step in the process comprises adjustment of the free ammonia content. By "free ammonia" as used throughout this specification and claims is meant any ammonia dissolved in the liquor per se, as ammonium hydroxide, and any ammonia combined with the metals as metal-ammonia complexions. This adjustment is necessary for several reasons. First, it is difficult to oxidize cobalt to its trivalent state when initially present as cobaltous ions. To effect the oxidation simply and completely, the cobalt must be in a complex ion form, i. e., as a soluble cobalt amine complex. Secondly, the nickel from cobalt separation depends on the substantial stability and solubility at certain hydrogen ion concentrations of a cobaltic ammine salt, as compared to the corresponding nickel ammine salt. Accordingly, sufficient free ammonia must be made available to form soluble ammine complexes of the cobalt and nickel contents. In addition, this free ammonia should be sufficient to form a stable ammine complex of the oxidized cobalt content. These objects may be obtained by providing sufficient ammonia to form, for instance, pentammines of the dissolved nickel and cobalt. Cobalt forms a hexammine complex in the presence of an excessive concentration of ammonia which on oxidation precipitates as an insoluble cobaltic hexammine salt at elevated temperatures. Adjusted ammonia concentration, therefore, should not be excessive so as to avoid any substantial formation of the hexammine complex as well as to avoid excessive acid consumption in subsequent neutralization.

Ammonia may be added in any desired manner. It may, for instance, be added as a gas or it may be first dissolved in water and then added to the feed liquor. It may also be partly obtained from added ammonium sulfate. Ammonia, therefore, may be derived from any of these sources.

Oxidation of cobalt creates a need for an additional one-half mol of sulfate anion per mol of cobalt. There must be available, therefore, at least three chemical equivalents of anions for each mol of nickel. This is best obtained by the addition of ammonium sulfate. Amounts of ammonium sulfate in excess of this requirement are not detrimental in any manner to the novel separation of this invention. In fact, an excess is desirable to avoid precipitation of cobalt oxides and hydroxides. Ammonium sulfate may be added as such. Alternatively, when treating liquors resulting from sulfuric acid leaching systems, it may be completely or in part formed in situ by neutralizing the liquor with ammonia.

After appropriate adjustment the liquor is subjected to oxidation with an oxygen-bearing oxidizing gas. This may be, for instance, air, oxygen-enriched air, or oxygen. This results in precipitation of manganese from solution as a mixture of oxides. It is not desired to limit the process of this invention by any particular theory of operation. It appears, however, that the cobalt content is first oxidized. The cobalt then precipitates the manganese content as oxides with simultaneous reduction of cobalt. At any rate, manganese precipitation is largely completed before the concentration of cobaltic cobalt increases to any extent.

Oxidation may be conducted at temperatures ranging as high as 90° C. and even higher, although oxidation of the cobalt content and precipitation of the manganese content will occur at room temperature. To precipitate a manganese oxide product, however, which may be easily separated by filtration, it is desirable to conduct the oxidation at temperatures somewhat higher than room temperature. Temperatures greater than 90° C., however, require pressure equipment and in addition favor precipitation of cobaltic hexammine salt at excessive $NH_3/Co$ ratios or $Co_3O_4$ at low $NH_3/Co$ ratios. Accordingly, oxidation should be conducted at about 90° C. or less, an excellent range being about 45°–85° C.

The pressure of oxidizing gas and the length of treatment period required to obtain optimum results are functions of various factors and may vary quite widely. Accordingly, a general range of pressures and of operating periods cannot be accurately defined. They will vary, for instance, in accordance with the composition of the oxygen-bearing oxidizing gas, the manner and speed in which the gas is incorporated into the liquor, and the manner in which the non-oxidizing components of the gas are vented. Oxidizing gas pressure required to obtain optimum results may best be described generally with respect to the liquor being treated. Thus, the pressure of oxidizing gas should be at least such as to effect substantially complete precipitation of dissolved manganese content. Additionally, the oxygen pressure must also be such as to satisfy the stoichiometric requirements for leaving the dissolved cobalt content in its cobaltic state after manganese precipitation.

After manganese precipitation, the mixture of manganese oxides may be recovered in any suitable manner as by filtration giving a product highly suitable for use as ferro-grade manganese. Oxidized liquor is next acidified to separate the nickel content. Neither cobaltous nor nickelous ammonium sulfate vary greatly in solubility between pH of about 1 to 7 although they appear to be less soluble at lower pH values. Cobaltic pentammine sulfate, on the other hand, is seriously affected by such a change in hydrogen ion concentration. Solubility of cobaltic pentammine sulfate rapidly increases from a neutral solution toward acid and reaches a maximum at a hydrogen ion concentration equivalent to about a 2.0% aqueous sulfuric acid solution. At these greater hydrogen ion concentrations cobaltic pentammine sulfate is exceedingly stable and soluble. Nickelous pentammine sulfate, however, is quite unstable and precipitates as nickel-ammonium sulfate double salt and part probably as nickel-cobalt-ammonium sulfate triple salt, if any cobaltous cobalt is present.

While some precipitation of nickel-ammonium sulfate may be obtained at pH values approaching neutral, precipitation to any appreciable extent does not occur until about pH 6. Extent of precipitation increases as the hydrogen ion concentration increases with optimum results being obtained between a pH of about 2 and a hydrogen ion concentration equivalent to about 2.0% aqueous sulfuric acid solution. At conditions more acid than this, the stability of cobaltic pentammine begins to decrease. Accordingly, the hydrogen ion concentration of the solution is adjusted by the addition of sulfuric acid.

Precipitated nickel-bearing solids may be separated in any suitable manner leaving a substantially nickel- and manganese-free cobalt bearing liquor. Both the nickel-bearing solids and the residual nickel-free cobalt bearing liquor may be treated, if desired, by processes which form no part of this invention to recover the metal contents as elemental metal.

Rather than removing the precipitated manganese solids after completion of oxidation and prior to nickel precipitation, they may be retained and the slurry treated to precipitate the nickel content in a manner as above described. On completion of precipitation of the nickel content, the nickel-manganese-bearing solids may be separated in any suitable manner. Separated solids may then be treated, for instance, with an ammonia-ammonium sulfate liquor to dissolve the nickel salts leaving a ferrograde manganese oxide product. Residual liquors may be treated by known processes to recover the metal contents.

The following examples will further demonstrate the invention.

Example 1

To 1700 ml. of a sulfate solution analyzing in grams per liter 55.6 cobalt, 18.1 nickel, 11.5 manganese, and 198 ammonium sulfate was added 810 ml. of aqua ammonia and the liquor treated at about 45° C. and 50 p. s. i. g. oxygen for 30 minutes to precipitate manganese. The hydrogen ion concentration of the slurry was then adjusted to pH 4 by the addition of sulfuric acid whereby the nickel content was precipitated mostly as a nickel-ammonium double salt but part as a nickel-cobalt-ammonium sulfate triple salt. The filtrate comprising 1290 ml. analyzed in grams per liter 53.7 cobalt, 0.2 nickel and 0.18 manganese. The residue analyzed 6.9% cobalt, 6.7% nickel and 4.0% manganese. The overall recoveries in the precipitate represented 99.3% for nickel and 98.9% for manganese. Precipitate is then treated with an ammonia-ammonium sulfate liquor to dissolve the nickel and cobalt salts leaving a manganese oxide product.

Example 2

To one liter of a sulfate solution analyzing in grams 38 cobalt, 8 nickel, 15 manganese and 150 ammonium sulfate is added 510 ml. of aqua ammonia and the liquor treated at about 60° C. and 85 p. s. i. g. oxygen for 40 minutes. Resultant slurry is then filtered giving a pure manganese oxide product and a residual liquor having the original nickel and cobalt concentrations and 0.4 gram per liter manganese. The liquor is then acidified with sulfuric acid to a pH of 2 to precipitate the nickel content as nickel-ammonium sulfate, which is separated leaving a cobalt-bearing liquor analyzing 35 grams per liter cobalt, 0.2 gram per liter nickel and 0.35 gram per liter manganese.

We claim:

1. In a hydrometallurgical process for recovering a substantially nickel-free cobalt solution from a liquor containing dissolved nickel sulfate and cobalt sulfate which comprises adjusting the solutes contents of said liquor to provide about 5 mols of ammonia for each mol of dissolved cobalt and about 5 mols of ammonia for each mol of dissolved nickel, and a sulfate ion concentration at least sufficient to satisfy the dissolved cobalt content in its trivalent state and dissolved nickel in its bivalent state; oxidizing the adjusted liquor with a sulfur-free, oxygen-bearing oxidizing gas; introducing sulfuric acid into said oxidized liquor to produce a hydrogen ion concentration greater than that equivalent to a pH of about 4 whereby a substantially cobalt-free nickel-bearing precipitate is formed; and separating said precipitate leaving a substantially nickel-free cobalt-bearing liquor, the improvement in combination therewith for treating a liquor containing dissolved manganese as well as dissolved nickel and cobalt sulfates which comprises: oxidizing the adjusted liquor until precipitation of manganese oxide substantially ceases, and then continuing oxidation for sufficient additional time to oxidize substantially the entire dissolved cobalt content.

2. A process according to claim 1 in which precipitated manganese and nickel are separated at the same time and leached with an ammonia-ammonium sulfate liquor leaving a manganese oxide product.

References Cited in the file of this patent

UNITED STATES PATENTS

| | | |
|---|---|---|
| 1,579,302 | Gidden et al. | Apr. 6, 1926 |
| 1,932,413 | Laury | Oct. 31, 1933 |
| 1,937,508 | Bradley | Dec. 5, 1933 |
| 1,947,457 | Bradley | Feb. 20, 1934 |
| 1,951,341 | Bradley | Mar. 20, 1934 |
| 2,576,314 | Forward | Nov. 27, 1951 |
| 2,647,820 | Forward | Aug. 4, 1953 |
| 2,647,827 | McGauley | Aug. 4, 1953 |
| 2,647,828 | McGauley | Aug. 4, 1953 |
| 2,694,006 | Schaufelberger et al. | Nov. 9, 1954 |

FOREIGN PATENTS

| | | |
|---|---|---|
| 17,672 | Great Britain | of 1912 |